Jan. 29, 1957  J. W. BECKHAM  2,779,325
SHINGLE CUTTER
Filed Dec. 20, 1954  2 Sheets-Sheet 1
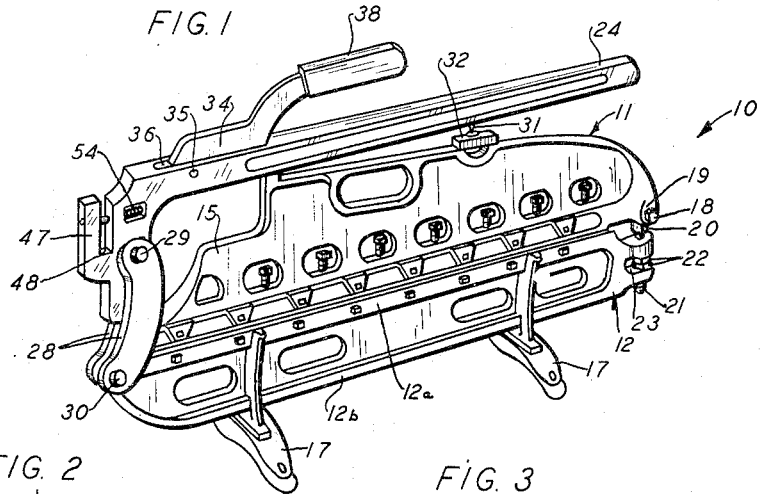
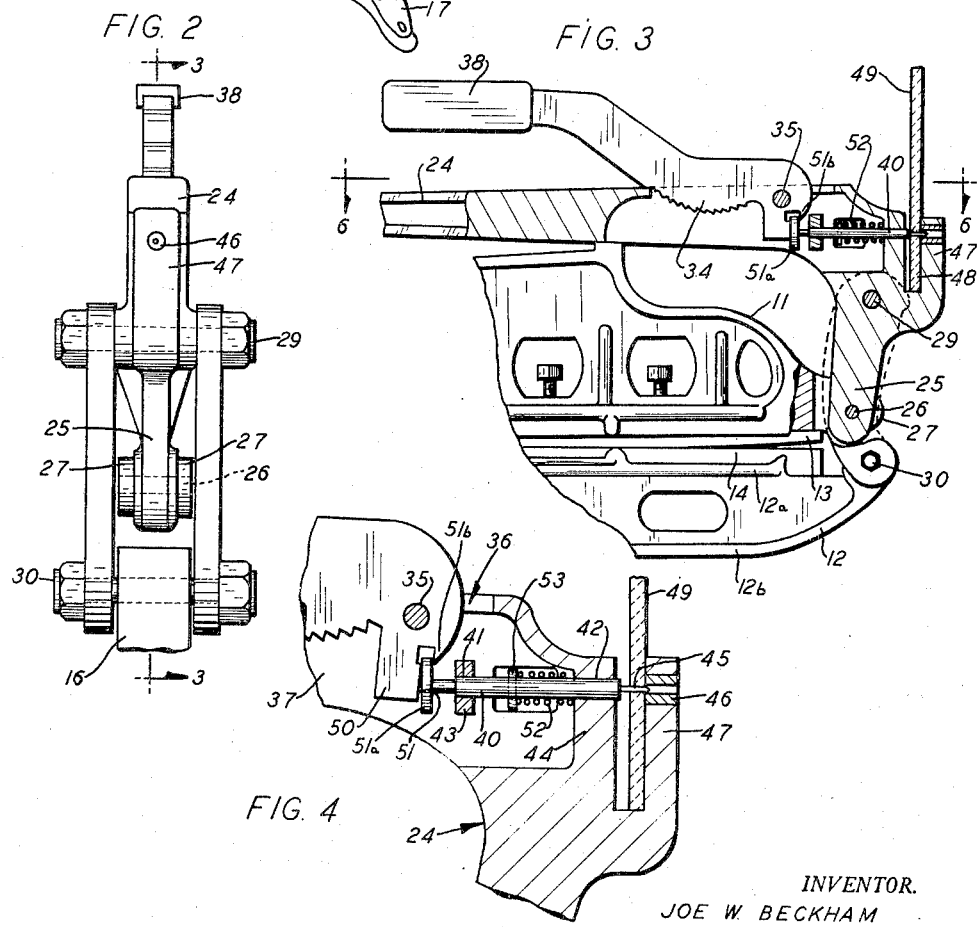
INVENTOR.
JOE W. BECKHAM
BY
Ooms, McDougall, Williams & Hersh
ATTORNEYS

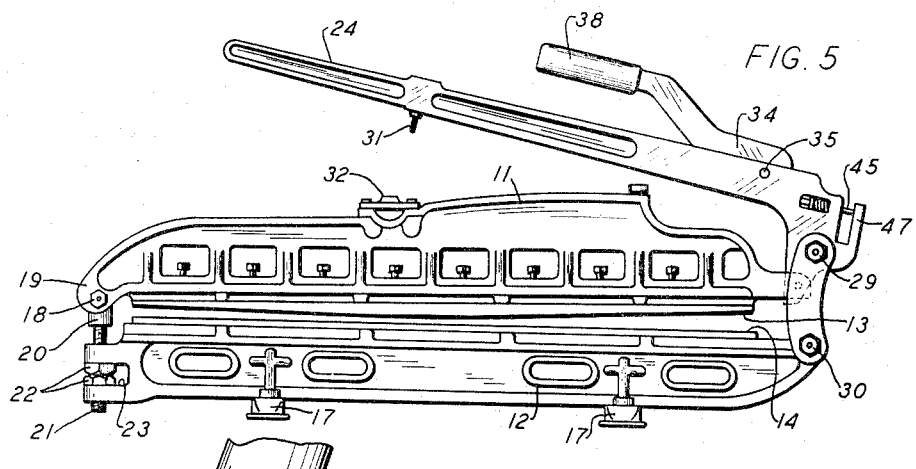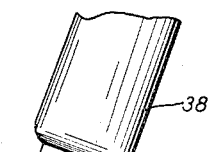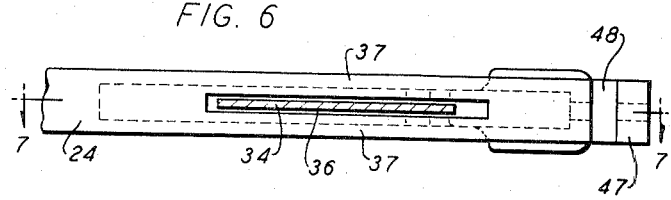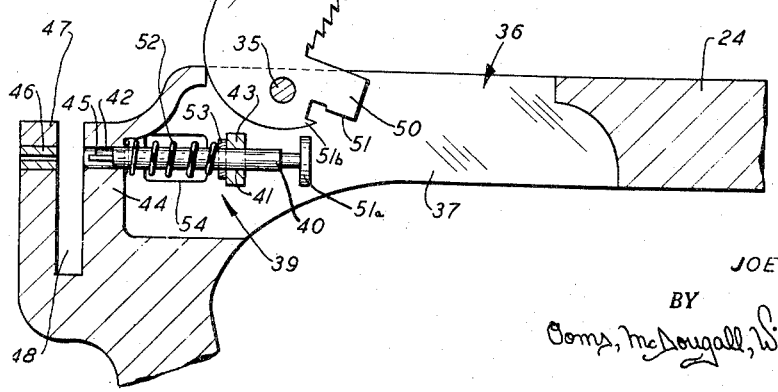

United States Patent Office 2,779,325
Patented Jan. 29, 1957

2,779,325

SHINGLE CUTTER

Joe W. Beckham, Lufkin, Tex., assignor to Texas Foundries, Inc., Lufkin, Tex., a corporation of Texas Application December 20, 1954, Serial No. 476,194

3 Claims. (Cl. 125—23)

This invention relates to shingle cutters for shearing and punching sheet materials such as asbestos shingles or siding, for example.

One principal object of the invention is to provide an improved shingle cutter whereby shingles or the like may not only be sheared to size, but may also be notched and punched.

A further object is to provide an improved shingle cutter having a combination cutting, notching, and punching mechanism operable as an adjunct to the main shearing mechanism of the cutter.

It is another object of the invention to provide a shingle cutter which combines, in a single light weight durable unit, all of the instrumentalities required to accomplish easily and conveniently the operations of trimming, notching, and punching shingles or the like.

Further objects and advantages of the invention will appear from the following description, taken with the accompanying drawings, in which:

Figure 1 is a general perspective view of a shingle cutter constituting an illustrative embodiment of the invention;

Fig. 2 is a fragmentary end view of the cutter, taken from the left, in Fig. 1;

Fig. 3 is a fragmentary elevational view, partly in section, along a line 3—3 in Fig. 2;

Fig. 4 is a fragmentary enlarged elevational sectional view similar to a portion of Fig. 3;

Fig. 5 is a right side elevational view of the shingle cutter with the main shearing blades partly opened;

Fig. 6 is a fragmentary sectional view taken generally along a line 6—6 in Fig. 3; and Fig. 7 is a fragmentary sectional view somewhat similar to Fig. 3 but showing a combination notching cutter and punch mechanism in a changed position.

From a consideration of the drawings in greater detail, it will be seen that Figs. 1 and 5 illustrate the general construction of an exemplary shingle cutter 10 which is of the type having a pair of main shearing blade holders or members 11 and 12 which hold and clamp upper and lower replaceable cutting knives 13 and 14, respectively. In this instance, the lower member 12 serves as a base and hence is provided with a pair of stands or feet 17. For rigidity, heavy upper and lower reinforcing ribs 12a and 12b are cast integrally with the base 12.

The upper member 11 and the base 12 are pivotally interconnected by means of a pivot bolt 18 extending through a bifurcated tail 19 formed on the rear end of the member 11. An apertured clevis member 20 is received in the bifurcated member and is pivoted on the bolt 18. In order to adjust the elevation of the upper cutting knife 13, the clevis 20 is provided with a threaded lower end portion 21 adapted to receive one or more adjusting nuts 22 which may be mounted in a notch 23 formed in the bed 12.

In order to swing the main cutter blades 13 and 14 into and out of shearing relation, the shingle cutter 10 is provided with an operating lever or handle 24 which is pivotally mounted on one of the members 11 and 12, in this case the member 11. More specifically, the main operating lever 24 has a nose portion 25 mounted on a pivot 26 which extends through a bifurcated front end portion 27 of the upper blade holder 11. The operating lever 24 is connected to the base 12 by means of a pair of toggle links 28. At their upper and lower ends, the toggle links 28 are connected to the lever 24 and the base 12 by means of upper and lower pivot bolts 29 and 30. It will be evident that the elongated operating handle and the toggle links 28 provide means whereby the knives 13 and 14 may be moved into shearing relation with considerable mechanical advantage. To punch nail holes in shingles or the like, a punch 31 may be mounted on the handle 24 for punching cooperation with an anvil or die 32 mounted on the upper edge of the upper blade carrying member 11. Downward movement of the handle 24 carries the punch 31 into operative relation to the die 32. The punching elements 31 and 32 may be employed to punch nail holes at points located a relatively great distance inwardly from the edges of a shingle.

In accordance with the invention, the shingle cutter 10 is provided with additional means for notching or making short cuts on a shingle, together with additional means for punching nail or other holes. More specifically, the exemplary shingle cutter 10 is equipped with an additional blade 34 which in this instance is arcuate and saw-toothed in form. In itself, this type of blade is well known and suitable for forming notches or other short cuts in asbestos shingles or the like. It will be seen that the notching blade 34 is mounted on the main operating lever or handle 24 by means of a pivot 35. In this instance, the blade 34 is movable in a slot 36 extending vertically through the handle. As shown to advantage in Fig. 6, the slot 36 is rectangular in shape and thus defines a pair of side walls 37 which lie on opposite sides of the blade 34 so as to function effectively as abutments in cutting relation to the blade. Thus, when the blade 34 is to be used, a shingle may be laid on the top of the handle under the blade. The handle acts as a table to support the shingle as the blade 34 is swung downwardly to cut the shingle. It will be seen that an elongated operating handle 38 is formed as an extension of the blade 34.

In accordance with the invention, the blade 34 provides a lever for operating a punching mechanism 39, which in this instance comprises a punch plunger 40 slidable in apertures 41 and 42 formed in bearing members 43 and 44 which are cast integrally with the main operating handle 24. A punch element 45, formed on the front end of the plunger 40, is movable into cooperative punching relation with an aperture die 46 which is mounted in an anvil 47. The anvil 47 is formed integrally with or otherwise fixed to the main operating handle 24. A slot 48 is defined between the anvil 47 and the main body of the handle 24 in order to receive a shingle 49 or the like to be punched.

In this instance, the punch plunger 40 is adapted to be advanced into punching relation to the anvil 47 by means of a depending striker arm 50 formed integrally on the pivoted blade 34. When the blade 34 is swung downwardly, an abutment surface 51 on the arm 50 engages the rear end of the punch 40 and pushes it forward so that it will penetrate the shingle. To provide for positive initial withdrawal of the punch 40 from the shingle, a head or button 51a is formed on the punch 40 for engagement by a lip or tooth 51b on the blade 34. Upward movement of the blade 34 swings the lip 51b rearwardly against the button 51a and thus positively initiates withdrawal of the punch 40, even if it is embedded in the shingle. The return movement of the punch is completed by a return spring 52 coiled around the punch between the bearing member 44 and a pin 53 or other abutment mounted on the punch 40. Rearward movement of the punch 40 is limited by engagement of the pin 53 with the bearing member 43. A pair of access openings 54 are forwarded in the walls 37 adjacent the spring 52.

In operation, an asbestos shingle or the like may be sheared to size by using the main cutting knives 13 and 14, which may be opened and closed by swinging the main operating lever 24 upwardly and downwardly. Nail holes may be punched in the shingle by inserting the shingle between the punch 31 and the die 32. In addition, notches or other cuts may be formed in the shingle by raising the auxiliary handle 38 with the main operating handle 24 in its lower operating position. The shingle may then be placed on top of the main handle 24 under the saw-toothed blade 34, and the handle 38 may be swung downwardly so that the blade 34 will cut the shingle. During this cutting operation, the wall elements on the main operating handle 24 serve as cutting abutments to support the shingle.

Nail or other holes may be formed in the shingle adjacent its edges by inserting the edge of the shingle into the notch 48 with the auxiliary handle 38 raised. When the handle 38 is lowered, the punch member 40 is advanced toward the anvil 47, with the result that the punch 45 forms a nail hole in the shingle. During the operation of the main cutter blades 13 and 14 the auxiliary handle 38 is kept in its lowered position and hence offers no interference with the operation of the main handle 24.

It will be evident that the exemplary shingle cutter combines in a single unit all of the instrumentalities needed to trim, shape, notch, and punch asbestos shingles or the like. The unit is fairly light in weight and is extremely easy and convenient to operate. The number of parts and weight of the cutter are minimized by utilizing the main operating handle to carry and cooperate with the notching and auxiliary punching elements. The entire unit is inexpensive, yet durable and trouble free.

Various modifications, alternative constructions and equivalents may be employed without departing from the true spirit and scope of the invention as exemplified in the foregoing description and defined in the following claims.

I claim:

1. In a device for punching and shearing shingles or the like, the combination comprising a member having a punch anvil and a shearing abutment fixed thereon, a punch movable on said member to and away from said anvil along a predetermined path between retracted and advanced positions, a spring biasing said punch to said retracted position, an enlarged head fixed on the rear end of said punch, a lever pivoted on said member and having a handle portion and a shearing blade fixed thereon, said lever being swingable about an axis spaced from said path and in a plane including said path and between a retracted position with said blade open and away from said abutment and an advanced position with said blade closed and in full shearing relation with said abutment, a generally radial striker arm on said lever, and a generally radial tooth spaced forwardly on said lever from said striker arm and defining a generally radial notch therebetween movable into and out of meshing relation with said head on said punch, said striker arm being swingable forwardly from a retracted position away from said punch with said lever in said retracted position to a position of engagement with the rear end of said head and thence forwardly to an advanced position with said punch and said lever in their advanced positions, said tooth being shorter than said striker arm and being swingable past said head with said punch in its retracted position, said notch being swingable into meshing relation with said head with said punch in its advanced position, said tooth being engageable with the front of said head with said punch in its advanced position and being swingable rearwardly for positively retracting said punch.

2. In a device for punching and shearing shingles or the like, the combination comprising a member having a punch anvil thereon and a slot therein with a shearing abutment adjacent said slot, a punch movable on said member to and away from said anvil along a predetermined path between retracted and advanced positions, a spring biasing said punch to said retracted position, an enlarged head fixed on the rear end of said punch, a lever pivoted on said member in said slot and having a handle portion and a saw-toothed shearing blade fixed thereon, said lever being swingable about an axis spaced from said path of said punch and in a plane including said path and between a retracted position with said blade open and away from said abutment and an advanced position with said blade closed and in full shearing relation with said abutment, a generally radial striker arm on said lever, and a generally radial tooth spaced forwardly on said lever from said striker arm and defining a generally radial notch therebetween movable into and out of meshing relation with said head on said punch, said striker arm being swingable forwardly from a retracted position away from said punch with said lever in said retracted position to a position of engagement with the rear end of said head and thence forwardly to an advanced position with said punch and said lever in their advanced positions, said tooth being shorter than said striker arm and being swingable past said head with said punch in its retracted position, said notch being swingable into meshing relation with said head with said punch in its advanced position, said tooth being engageable with the front of said head with said punch in its advanced position and being swingable rearwardly for positively retracting said punch.

3. A combination cutter and punch device for shingles or the like, said device comprising upper and lower pivotally interconnected shearing knives, means for operating said knives and including a main elongated handle connected to said knives and swingable in a vertical plane to move said knives into and out of shearing relation, said handle having a punch anvil thereon and a slot therein with a shearing abutment adjacent said slot, a punch movable on said main handle to and away from said anvil along a predetermined path between retracted and advanced positions, a spring biasing said punch to said retracted position, an enlarged head fixed on the rear end of said punch, a lever pivoted on said handle in said slot and having a handle portion and a saw-toothed shearing blade fixed thereon, said lever being swingable about an axis spaced from said path of said punch in a plane including said path and between a retracted position with said blade open and away from said abutment and an advanced position with said blade closed and in full shearing relation with said abutment, a generally radial striker arm on said lever, and a generally radial tooth spaced forwardly on said lever from said striker arm and defining a generally radial notch therebetween movable into and out of meshing relation with said head on said punch, said striker arm being swingable forwardly from a retracted position away from said punch with said lever in said retracted position to a position of engagement with the rear end of said head and thence forwardly to an advanced position with said punch and said lever in their advanced positions, said tooth being shorter than said striker arm and being swingable past said head with said punch in its retracted position, said notch being swingable into meshing relation with said head with said punch in its advanced position, said tooth being engageable with the front of said head with said punch in its advanced position and being swingable rearwardly for positively retracting said punch.

References Cited in the file of this patent

UNITED STATES PATENTS

| | | |
|---|---|---|
| 1,473,558 | Jensen | Nov. 6, 1923 |
| 1,623,824 | Bondeson | Apr. 5, 1927 |
| 1,981,695 | Gundlach | Nov. 20, 1934 |
| 2,077,474 | Gundlach | Apr. 20, 1937 |
| 2,496,018 | Pearson | Jan. 31, 1950 |